Aug. 19, 1924.                                               1,505,498
                          B. S. ROSS
                   PRICE CALCULATING MACHINE
                     Filed June 30, 1923

INVENTOR
BENJAMIN STANLEY ROSS

BY Fetherstonhaugh & Co
ATTORNEYS

Patented Aug. 19, 1924.

1,505,498

UNITED STATES PATENT OFFICE.

BENJAMIN STANLEY ROSS, OF NEW WESTMINSTER, BRITISH COLUMBIA, CANADA.

PRICE-CALCULATING MACHINE.

Application filed June 30, 1923. Serial No. 648,728.

*To all whom it may concern:*

Be it known that I, BENJAMIN STANLEY ROSS, a subject of the King of Great Britain, and a resident of the city of New Westminster, in the Province of British Columbia, Canada, have invented certain new and useful Improvements in Price-Calculating Machines, of which the following is a specification.

My invention relates to improvements in price calculating machines, the objects of which are to provide means whereby a merchant can quickly and with unfailing accuracy determine at what price articles must be sold to provide for overhead expenses and to leave a desired profit on the sales. The invention consists essentially of a rotatable price chart superimposed by corelated stationary and slidable interest scales, as will be more fully described in the following specification, in which:—

In the drawings like characters of reference indicate corresponding parts in each figure.

Figure 1:
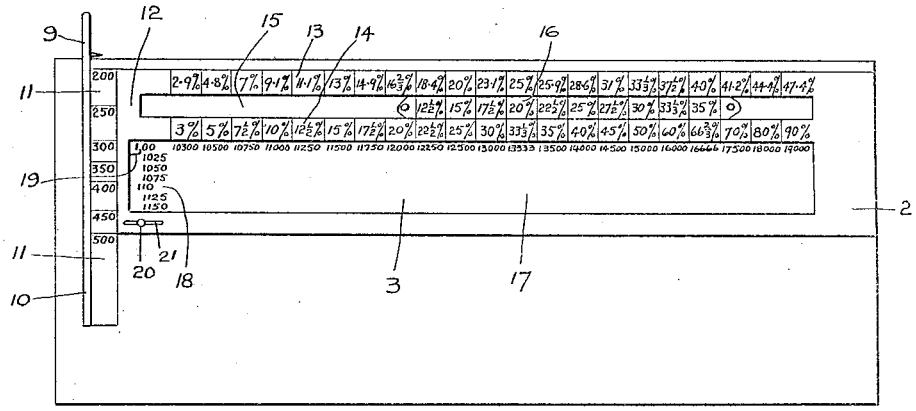
Fig. 1 is a front view of my invention.
Figure 2:
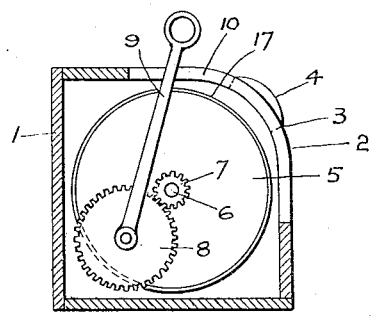
Fig. 2 is a sectional view showing the chart rotating mechanism.
Figure 3:
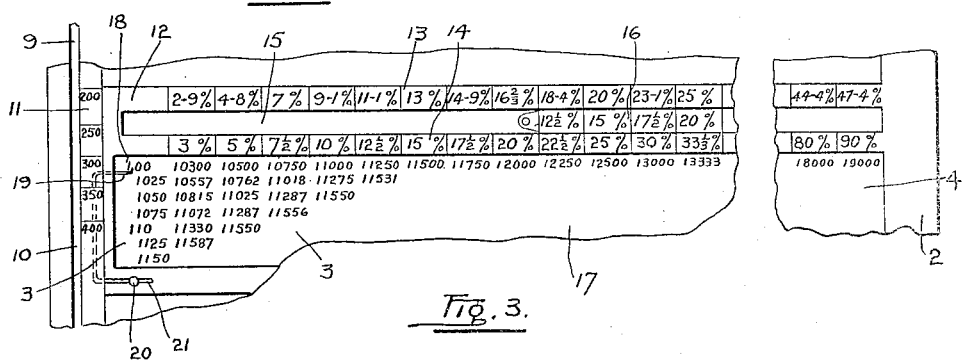
Fig. 3 is an enlarged fragmentary view of the several scales.

The numeral 1 indicates a casing which is preferably arranged with a rounded portion 2 extending longitudinally thereof in which is provided an elongated horizontal viewing aperture 3 which is covered with a magnifying glass strip 4. 5 is a roller mounted upon a shaft 6 which is suitably journalled at opposite ends. 7 is a pinion secured to the shaft 6 and in mesh with a larger diameter gear 8 suitably journalled and having a lever 9 by which the pinion 7, gear 8 and roller 5 are rotated. The lever 9 is designed to project beyond the casing 1 and to operate in a slot 10 provided therein, in such a manner that the total arc described by the lever causes the roller to describe one revolution.

The numeral 11 indicates a scale disposed to one side of the slot 10, which forms a general index of the base or cost figures of the rotatable chart 17, so that when the lever 9 is brought to rest at any one of the figures of the scale 11, the corresponding cost figures and its percentages is disposed in a horizontal row within the viewing aperture 3 and a minor adjustment only is required to bring the desired row of figures into accurate reading alignment below the percentage scales 13, 14 and 16. The numeral 12 indicates generally a percentage tabulator which consists of an upper scale 13 and a lower scale 14 spaced apart to form an intervening slot 15 in which a scale 16 is slidably movable.

Each of the scales 13, 14 and 16 have divisions of equal length in which are marked varying percentages, the scale 13 represents various percentages "off" selling prices, the scale 14 represents various percentages "on" (or to be added to) cost prices, and the sliding scale 16 represents various percentages of overhead expenses which are always estimated on sales totals and which must be provided for in the selling price of all goods sold. The scales 13 and 14 are corelated in so far as any given figure on scale 14 represents a percentage which must be added to a given cost price to show in the space immediately above it upon scale 13 the percentage which can be deducted from the selling price to equal the original or the cost price figure.

A chart 17 is mounted upon the periphery of the roller 5 such chart comprising a plurality of rows of figures arranged one below the other successively increasing in amounts, the first figures forming column 18 of any of the rows represent cost prices, as for instance 100 would represent 1 cent, 10 cents, $1.00, $10.00 or $100.00 and each successive figure to the right thereof would represent the cost price plus the percentage indicated on scale 14 immediately above it, and likewise the percentage which would have to be taken from such figure to leave the original cost price as in column 18 would be indicated vertically above the gross price on scale 13. The base or cost price figure which represent unity are for convenience in quick reading, staggered with respect to all the others, which latter represent decimal increases thereon, though I may prefer to arrange all of such figures in regular vertical alignment using a distinctive colour for the unit figure to that used for the remainder.

The numeral 19 indicates a pointer which is actuated by a button 20 within a slot 21 in the front of the casing 1 and may be set to indicate any desired decimal point on the base figures in column 18, thus if 100 is intended to be read as $1.00, the pointer would be set immediately to the right of the first digit.

It will be apparent that the sub-division of the base figures in column 18 and their corresponding percentage increases may be varied from that shown, but the arrangement indicated is sufficient for most classes of business and will serve to illustrate the purpose and operation of the invention.

It is recognized practice to base overhead expense and profit at all times on the total turnover of a business, hence it is necessary to add all such charges to the cost of every article sold and if a merchant knowing his overhead expenses and desired profit on selling price to be 20% were to add that 20% to the cost of a $1.00 article making the selling price therefor $1.20 he would ultimately find that he was selling the article at a loss of 6 cents in so far as 20% from the selling price of $1.20 would leave 94 cents, hence the necessity for adding a percentage to cost which is the equivalent of a desired percentage off selling price. For the purpose of illustrating the manner in which this is done with my invention we will assume that the overhead expenses to be provided for amount to 15% and that the merchant desires a profit of 5%. The operator moves the sliding scale 16 until the percentage figure 15 is immediately under the figure on scale 13 which equals the 15% overhead plus the desired 5% profit, viz: 20%, when he will find immediately below both of these on scale 14 a percentage 25 which represents the amount which must be added to cost to provide the desired result, and in the vertical column immediately below the 25 on chart 17 is to be found the necessary selling price for all articles of any cost which are based on the above mentioned overhead and profit. Assuming therefore, to use but a single illustration that the selling price is to be determined on an article which costs $1.00. The lever 9 is moved within the slot 10 until it is adjacent the figure 100 on the scale 11, which movement will rotate the roller 5 and bring the figure 100 of column 18 on the chart 17 approximately into position within the viewing opening 3, a further slight movement of the lever will align the figure 100 and its corresponding percentage increases immediately horizontally below the scale 14. The pointer 19 may be moved if desired to indicate $1.00 which represents cost and on reading the figure on the same line, which is immediately below 25 on scale 14 the answer 12500 will be read, the decimal point being immediately to the right of the first digit on the base price figure will indicate a similar reading being taken of the answer, viz: 1.2500 or $1.25.

To find any other selling price it suffices to bring its cost figure in column 18 immediately below scale 14 and read the answer as before under the percentage 25 thereon.

It will thus be seen that I have invented a simple calculating device in which the various scales are so corelated that on overhead costs and profit having been once determined and co-ordinated that the prices at which all articles must be sold may be read in a single column and adjusted for such reading by a single movement of the operating lever for each separate cost value.

What I claim as my invention is:

A device of the class described comprising a rotatable chart having a column of base or cost price figures successively increasing in value, a horizontal row of figures to each base figure representing the base figure plus a given percentage increase thereon, an upper and a lower percentage scale spaced apart to define an intervening slot, a percentage scale indicating overhead expenses slidable within the slot the percentages of which are adapted to be read in conjunction with the upper scale to determine desired profit, and means whereby a selling price may be read in a single vertical column immediately below the desired overhead percentage on an article of any given cost price.

Signed and dated at New Westminster, B. C. this 12th day of May 1923.

BENJAMIN STANLEY ROSS.

Witnesses:
K. C. MACGOWAN,
PATRICIA M. RENNIE.